United States Patent
Kirkland

(10) Patent No.: US 8,245,967 B2
(45) Date of Patent: Aug. 21, 2012

(54) ACTUATOR FORCE EQUALIZATION CONTROLLER

(75) Inventor: Douglas B. Kirkland, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 811 days.

(21) Appl. No.: 12/323,090

(22) Filed: Nov. 25, 2008

(65) Prior Publication Data
US 2010/0127132 A1    May 27, 2010

(51) Int. Cl.
B64C 13/16    (2006.01)
(52) U.S. Cl. .......................... 244/76 R; 244/76 A; 701/3
(58) Field of Classification Search .................. 244/195, 244/227, 76 A, 76 R; 701/3
See application file for complete search history.

(56) References Cited

U.S. PATENT DOCUMENTS

| | | | |
|---|---|---|---|
| 4,800,798 A * | 1/1989 | Boldrin et al. .................. 91/361 |
| 4,825,748 A | 5/1989 | Sheng | |
| 4,947,732 A | 8/1990 | Hidenobu | |
| 5,121,042 A * | 6/1992 | Ako ............................... 318/657 |
| 5,129,310 A * | 7/1992 | Ma ................................... 91/171 |
| 5,274,314 A * | 12/1993 | Maqueira ...................... 318/632 |
| 5,615,593 A * | 4/1997 | Anderson et al. .................. 91/24 |
| 5,806,805 A | 9/1998 | Elbert et al. | |
| 7,474,944 B2 * | 1/2009 | Cartmell et al. ................... 701/3 |
| 2003/0127569 A1* | 7/2003 | Bacon et al. ................... 244/195 |
| 2004/0078121 A1* | 4/2004 | Cartmell et al. ................... 701/3 |
| 2004/0111190 A1* | 6/2004 | Van De Kreeke et al. ........ 701/3 |
| 2005/0116095 A1* | 6/2005 | Cline et al. .................. 244/75 R |
| 2011/0108671 A1* | 5/2011 | Soronda ........................ 244/195 |
| 2011/0251739 A1* | 10/2011 | Tomas et al. ....................... 701/3 |

* cited by examiner

Primary Examiner — Benjamin P Lee
(74) Attorney, Agent, or Firm — Yee & Associates, P.C.

(57) ABSTRACT

An actuation system including a plurality of actuators; a plurality of position sensors coupled to the actuators, the plurality of position sensors providing rate feedback signals proportional to an actuator rate; a plurality of force sensors coupled to the actuators, the plurality of force sensors providing delta pressure signals; and a feedback control loop configured to receive the rate feedback signals and delta pressure signals and compute a difference in actual actuator rates and sum the difference with a computed difference in actuator forces to generate actuator positioning commands that equalize the actuator forces on a control surface.

19 Claims, 6 Drawing Sheets

2 Actuator Load Loop MODEL

3 Actuator Load Loop MODEL

ACTUATOR FORCE EQUALIZATION CONTROLLER

BACKGROUND

1. Technical Field

The present description relates to airplane actuation systems and, more particularly, to flight control actuator force equalization.

2. Related Art

Flight control systems have been the object of much effort directed toward enhancing the reliability and survivability of aircraft during flight.

Generally, commands are translated into electrical signals through the use of transducers that sense the inputs. The electrical signals produced by the transducers are fed to a flight computer, along with other data indicative of flight parameters. Based upon the data it receives, the flight computer generates signals designed to achieve the desired flight path commanded. These signals are transmitted electrically, in typical control systems, to actuator controller units.

The traditional problem encountered by aircraft flight control surfaces having multiple actuators is the ability to ensure that the actuators are positioned at relatively the same position to avoid the large forces that may occur due to actuator mis-positioning, which may lead to metal fatigue damage. Fatigue damage occurs for any force transient, no matter how limited in duration.

SUMMARY

The present disclosure provides a system and associated method for mitigating fatigue damage using a force equalization controller (FEC) that provides a force equalization function to address the performance and stability requirements of advanced aircraft designs.

Force equalization includes sensing the forces in each actuator of an actuation system and providing a corrective position command to reduce the difference between these forces.

In one aspect, a method is provided for controlling the forces between actuators in a multi-actuator actuation system including determining a first force fight component substantially equal to an amount of an actuator position that contributes to a force fight on a control surface; determining a second force fight component substantially equal to an amount of a force that contributes to the force fight on the control surface; multiplying the first force fight component by a lead-lag factor to generate a factored first force fight component; summing the factored first force fight component and the second force fight component to generate a predicted force fight; and generating a force equalization command as a function of the predicted force fight to cause a compensating change to the actuator position.

In another aspect, an actuation system is provided including a plurality of actuators; a plurality of position sensors coupled to the actuators, the plurality of position sensors providing rate feedback signals proportional to an actuator rate; a plurality of force sensors coupled to the actuators, the plurality of force sensors providing delta pressure signals; and a feedback control loop configured to receive the rate feedback signals and delta pressure signals and compute a difference in actual actuator rates and sum the difference with a computed difference in actuator forces to generate actuator positioning commands that equalize the actuator forces on a control surface.

In another aspect, a method is provided for controlling the forces between actuators in a multi-actuator actuation system including receiving from a plurality of position sensors a signal proportional to an actuator rate; receiving from a plurality of force sensors a signal proportional to an actuator ram force; and computing a difference in actual actuator rates and summing the difference with a computed difference in actuator forces to generate actuator positioning commands that equalize the actuator forces on a control surface.

The FEC provides a rate signal taken from a point after the actuator summing node that creates position error, but prior to the actuator position. This rate signal provides an actuator effective rate feedback to the FEC which allows for larger controller gains while keeping the system stable. The addition of the effective rate feedback maintains the controller stability when the gains that effect the force equalization are increased to achieve the required performance.

The FEC also has the residual effect of reducing the sensitivity of the airplane and the actuation system to certain failure modes that historically caused oscillatory failure effects.

The FEC supports the fatigue design of the actuation system without requiring heavy or costly materials. The FEC reduces the fatigue design dependence upon the actuation system rigging process and avoids more complicated rigging processes. The FEC helps avoid development and validation of safety monitors to detect occurrence of some critical failure modes. The FEC also helps to save weight on certain "lightweight" designs compared to designs that have sufficient metal to withstand the fatigue damage.

The FEC also supports electronically signaled fly by wires system architectures and, supports the use of less accurate, low cost actuator positioning sensors that are already part of the fly by wire system.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will new be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Generally, on control surfaces the applied forces that may cause fatigue occur because the structure is working against the intended load forces. For example, the actuators in a multiple actuator actuation system are not always properly positioned to share the intended load. In some instances, difference in actuator positioning may create a reactive force. These conditions are examples of "force fight."

Generally, force equalization controllers sense the pressure difference across each of the hydraulic actuator pistons to determine the applied force per piston. The difference in actuator forces is then used, to identify the portion of the actuator force that may be attributed to force fight. The actuator force fight is then converted to a change in the position command for each actuator that ideally eliminates the force fight. The change in actuator position command is passed through a dead zone function to prevent limit cycles due to actuator friction and command path quantization effects and then low pass filtered to prevent instability.

Figure 1A:
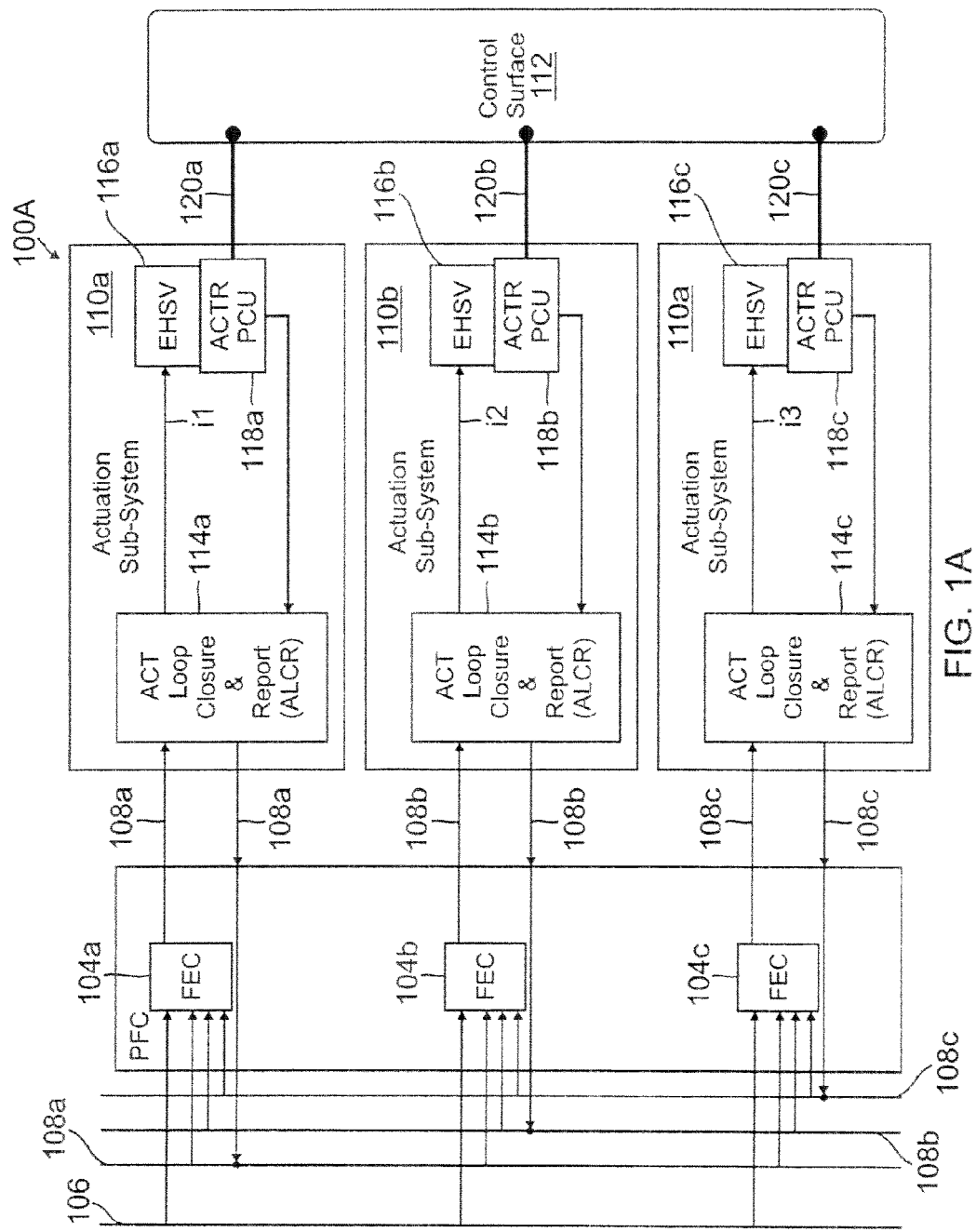
FIGS. 1A and 1B are simplified and generalized block diagrams of a three actuator and a two actuator actuation systems, respectively.
Figure 1B:
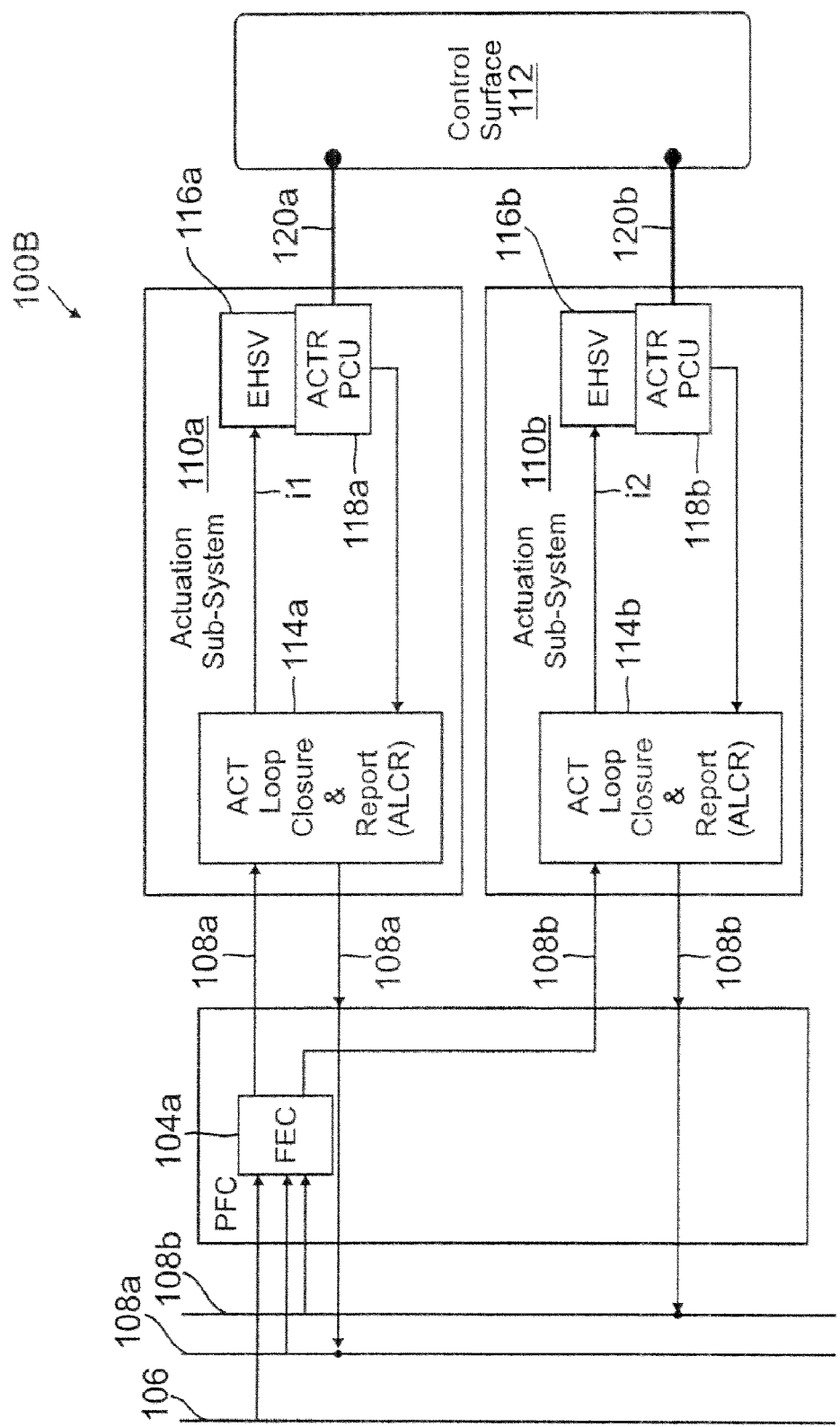

FIGS. 1A and 1B are simplified block diagrams illustrating exemplary actuation systems 100A and 100B including three actuators and two actuators, respectively, used to position control surface 112. Actuation system 100A and 100B may include an arbitrary number of primary flight computers (PFC(s)). As described in detail below, depending on the number of control surface actuators, the PFC may include an appropriate number of FECs, such as one or three FECs in the examples disclosed.

As shown, in FIG. 1A, actuation system 100A includes three FECs 104a, 104b and 104c for a control surface 112 with three actuators. As shown in FIG. 1B, actuation system 100B includes one FEC 104a for a surface with two actuators. Although features of the invention are now to be described in one context of the three actuator actuation system 100A, it should be understood that the description applies to the similarly numbered components of the two actuator actuation system 100B.

Actuation system 100A includes a flight control databus 106 over which the PFC(s) share data via data paths 108a, 108b, and 108c to each of the actuation loop closure and reporting (ALCR) blocks 114a, 114b, and 114c in actuation sub-systems 110a, 110b and 110c.

Actuation sub-systems 110a, 110b and 110c also include power control units (PCU) for each of the control surface actuators (ACTR) 118a, 118b, and 118c, where each actuator includes a delta pressure sensor and an electro-hydraulic servo valve (EHSV) 116a, 116b, 116c, and where each EHSV includes a position sensor. Each of the ACTRs 118a, 118b, and 118c include a ram (i.e. piston) 120a, 120b and 120c that positions the control surface 112.

Each PFC found in actuation systems 100A or 100B generate all of the flight control surface commands based on pilot or autopilot control signals which dictate the position of the actuators. The PFC(s) include FECs 104a, 104b, and 104c that provide force equalization functions, such as generating force fight equalization commands as described in more detail below.

In actuation system 100A, actuator commands generated by the PFC(s) are transmitted to the corresponding PCU through the appropriate FEC 104a, 104b, and 104c and then through channel data paths, such as paths 108a, 108b, 108c. The coupling of the FEC, which combines the pilot or autopilot control signals with the local force equalization commands, with its associated PCU defines a control channel. For example, FEC 104a transmits actuator commands to ALCR 114a in actuation sub-system 110a over the first channel data path 108a. The FEC 104b and the third FEC 104c perform similarly with their associated ALCR and PCU. After the actuator commands are received by ALCRs 114a, 114b, and 114c, each ALCR processes the actuator commands, along with other feedback data, to generate a control current $i_{1,2 \text{ or } 3}$ in response to the received commands and feedback data.

The flight control surface 112 is moved by the actuation sub-systems PCU ram 120a, 120b and 120c to the commanded position for desired aircraft flight. The flight control surface 112 could be, for example, an aileron, a flaperon, a rudder, or an elevator or any other control surface that uses multiple hydraulic actuators, such as elevons, canards and ruddervators.

Figure 2:
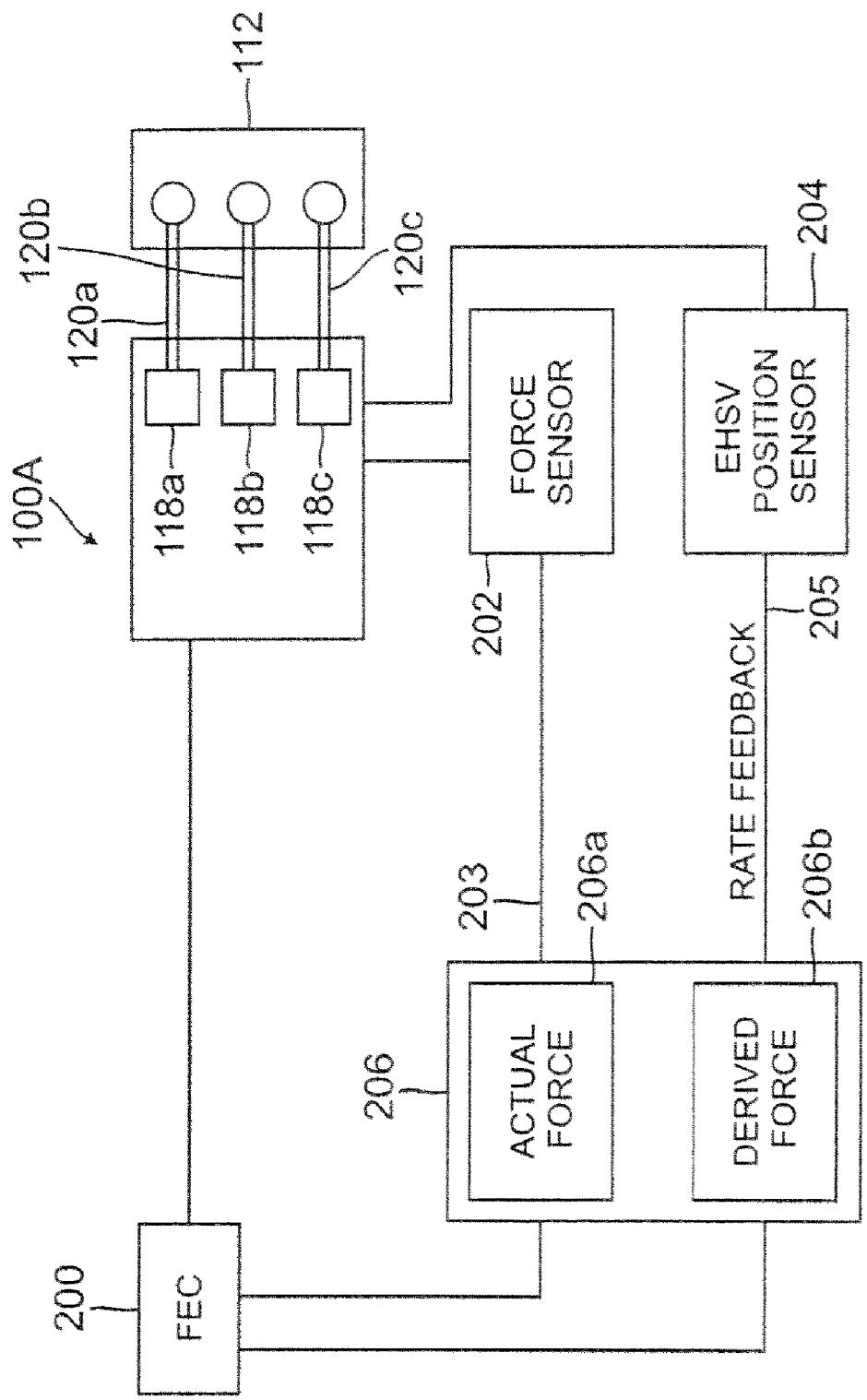
FIG. 2 is a simplified block diagram illustrating a force equalization controller in use with the actuation system of FIG. 1 in accordance with an embodiment of the disclosure.

FIG. 2 is a simplified block diagram illustrating the FEC block 200, which provides FEC function to actuation system 100A, in the three actuator embodiment. It should be understood that the functions described below apply to similarly numbered features of actuation system 100B. The FEC block 200 functions may be used in conjunction with the actuator force sensors 202, the EHSV position sensors 204 and the force sensing load loop 206. In one embodiment, actuator force sensors 202 and EHSV position sensors 204 report a feedback signal proportional to actuator rate and actuator ram forces, respectively, to force sensing load loop 206 to nominally equalize the forces experienced in actuators 118a, 118b and 118c. The FEC block 200 computes the difference in actuator rates and appropriately sums that difference with the computed difference in actuator forces to provide actuator positioning commands that equalize the actuator forces.

As described in detail below, rate feedback signals that are proportional to actuator rate are provided to FEC block 200 to provide rate feedback stabilization to allow for larger controller gains for increased force equalization performance. In one embodiment, actuator rate feedback, sensed by the EHSV position sensors 204, are used to improve force equalization performance and thereby reduce force fight induced fatigue damage while maintaining adequate stability margins. Actuator rate feedback may be taken from any arbitrary point between the output of the loop closure summing node and prior to the PCU ram position.

Referring now to an operational embodiment, using the two actuator actuation system 100B of FIG. 1B as an example. System 100B receives a command to move control surface 112, which means that system 100B operates to both begin to move control surface 112 and eventually stop control surface 112. In this operational example, actuator 118a may be assumed to have tolerances that make actuator 118a relatively quick to respond to the command, but also may have a position sensor that overstates the position of control surface 112. In contrast, actuator 118b, may have tolerances with the opposite effects; a slow response and an understated position.

In this embodiment, actuator 118a initially responds quickly to the command and its EHSV position changes differently relative to the EHSV position of actuator 118b. If left uncompensated, the change in EHSV position leads to a relative difference in positions of the actuator PCU 120a and 120b and quickly creates force fight.

However, in accordance with the present invention, the EHSV positions are fed back to the FEC 200 (FIG. 2). The FEC 200 senses the differences in the EHSV positions from position sensors 204 in conjunction with the derived force function 206b. In response, FEC 200 reduces the command to the faster actuator 118a and increases the command to the slower actuator 118b. This causes the PCUs 120a and 120b to begin to move at nearly the same rate.

In the longer term, small rate differences are manifested as a small position difference between the PCUs, which are sensed by force sensors 202, and the Initial correction via the EHSV position sensor path 205 is further modified by the difference between the force sensors. Additionally, the correction via the EHSV position sensors eventually transitions to the force sensor path 203.

The scenario associated with stopping control surface 112 is similar, albeit in reverse. In this example, the faster actuator 118a senses it has achieved its position objective at a lesser position than the actuator 118b since its position sensor over states position. Since first actuator 118a thinks it is near its stopping point, the EHSV 116a begins to close while the EHSV 116b of second actuator 118b remains open. This relative EHSV position difference is sensed by the EHSV position sensors 204 in conjunction with the derived force function 206b. FEC 200 commands the first EHSV 116a to re-open and commands the second EHSV 116b to begin closing.

A secondary effect is that the FEC block 200 changes the PCU position commands. For example, the first actuator 118a, that is under-positioned since its position sensor overstates its position, may be commanded to move further and the second actuator 118b may be commanded to move to a lesser position. These actions adjust each actuators command to account for position sensor errors that cause the PCUs to misposition.

Eventually, as the first actuator 118a wants to stop as it nears its commanded position, the second actuator 118b may need to continue to move further to achieve its commanded position since it moves slower and since its sensor errors may actually cause it to move further than the command indicated it should move. Accordingly, the first actuator 118a is commanded to move further, to avoid force fight, since the second actuator's EHSV position is still open and there is a relative difference in the EHSV positions that is sensed by sensors 204 in conjunction with the derived force function 206b and corrected by the FEC 200.

Residual EHSV position errors that cause relative PCU positioning differences and therefore, force fight, are sensed by force sensors 202 and actual force sensing block 206b acts with FEC 200 to provide adjusted position commands to reduce the force fight.

A similar approach to the two actuator system (FIG. 1B), is taken for the three actuator system (FIG. 1A), except that the predicted force fight component in each actuator is computed and an "average" estimate of the force fight is used to compute both the force fight in each actuator and the EHSV predicted force fight in each actuator.

Figure 3A:
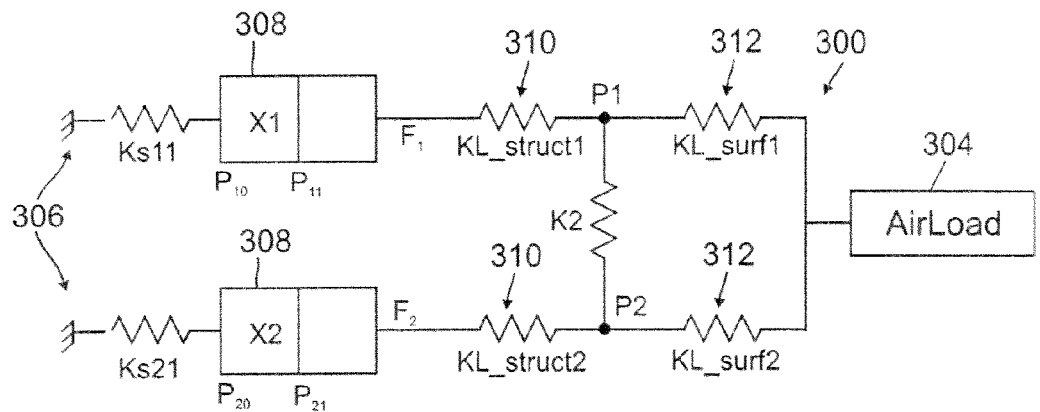
FIGS. 3A and 3B represent a two actuator load loop and a three actuator load loop in accordance with an embodiment of the disclosure.
Figure 3B:
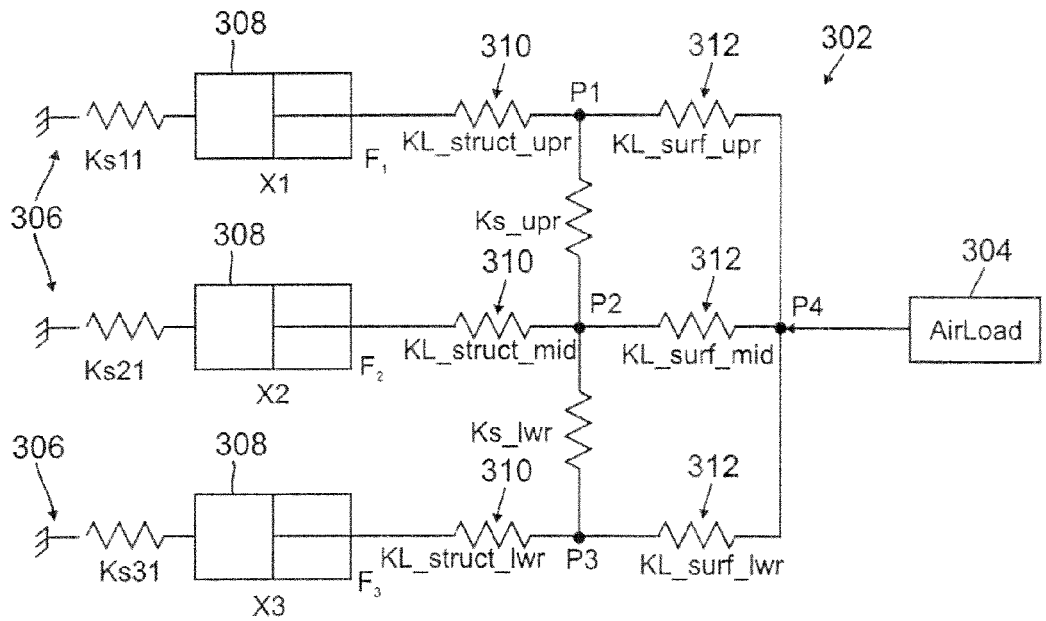

FIGS. 3A and 3B are functional diagrams representing a two actuator load loop 300 and a three actuator load loop 302 embodiment, respectively. In both embodiments, the sum of the actuation forces is equal to the airload 304. A multi-actuator actuation system generally requires that the actuators work together to position the control surface against the airload 304. The changes in the stress, incurred as the actuators work together against the airload, causes fatigue in the actuation system and structural components. However, the actuators do not necessarily work together precisely and create additional stress and fatigue. The forces that arise due to relative mis-positioning of the actuators and the force fight load loop stiffness cause additional fatigue and thus, are minimized.

As shown in FIGS. 3A and 3B, the lumped parameter models 306 (Ks11, Ks21 and Ks31) represent a combined backup structure stiffness, an actuator housing and fitting stiffness and a hydraulic oil column and piston stiffness that are within the actuator control loop. The values of these stiffnesses are increased by the effect of the actuator control loop.

The position terms 308 (X1, X2 and X3) represent the relative positions of the piston and the actuator housing. In the event that position term X1 is equal to position terms X2 and X3, no force fight occurs. The stiffnesses of the actuator pistons that are not in the control loop as well as the stiffness of the fittings that connect the piston to the control surface are referenced as lumped parameter models 310 and represented by the terms KL_struct1 and KL_struct2 in FIG. 3A and _ KL_struct_upr, KL_struct_mid and KL_struct_lwr in FIG. 3B. The terms KL_surf1 and KL_surf2 in FIG. 3A and KL_surf_upr, KL_surf_mid and KL_surf_lwr in FIG. 3B represent lumped parameter models 312 of the stiffness of the control surface itself, from the positions where the fittings attach to the surface (P1, P2 and P3) to a center of pressure where the average airload acts on the control surface.

For the two actuator system shown in FIG. 3A, the effective force fight loop stiffness is the ratio of the force, F1, to the relative distance, X1, given that X2 is held constant. A similar relationship holds for the three actuator system of FIG. 3B.

The measured static force in an actuator may be determined to be the force due to a particular actuator's share of the airload (AL) plus a delta force that is representative of any force fight, thus, ignoring friction forces yields:

$$F_{1\text{-}meas} = F_1 + \Delta F_1, F_{2\text{-}meas} = F_2 + \Delta F_2, F_{3\text{-}meas} = F_3 + \Delta F_3$$

where $F_1$, $F_2$ & $F_3$ are represented by $$F_1 = F_2 = F_3 = \frac{AL}{\#\text{ active\_actuators}}$$

and assuming: Ks11=Ks21=Ks31 and Ks1=Ks2=Ks3. The sum of the actuator forces is equal to the airload:

$$\sum_{i=1}^{i=\#actuators} Ki * F_{i\text{-}meas} = AL; \text{ which implies } \sum_{i=1}^{i=\#actuators} Ki * \Delta F_i = 0$$

therefore, the load in actuator 1, for example, due to force fight is given by:

$$\Delta F_1 = F_{1\text{-}meas} - \frac{AL}{\#\text{ active\_actuators}}$$

$$\Delta F_1 = \frac{F_{1\text{-}meas} * \#\text{active\_actuators} - (K1 * F_{1\text{-}meas} + K2 * F_{2\text{-}meas} + K3 * F_{3\text{-}meas})}{\#\text{ active\_actuators}}$$

KX=1 if the actuator is active, else =0.

Referring again to FIG. 2, force sensors 202 include the normal characteristics and their effect on force equalization and force fight fatigue monitoring.

In one embodiment, force sensors 202 may be based upon linear variable differential transformers (LVDTs) that measure displacement of a spool acting upon a known spring (F=K*x). The pressures on either side of the spool are the same as the pressures on either side of the piston. The ratio of the areas of the two sides of the spool are made to be the same as the ratio of the areas of the two sides of the actuator so the force; of an unbalanced actuator can be correctly measured. Alternatively, force sensors 202 may be based upon piezo-electric pressure sensors or any other suitable force sensors.

The normal characteristics to be considered include, offset, gain error and hysteresis. These characteristics may be specified in a normalized fashion so each actuation system is specified with the same normalized values. In one embodiment, the value used for normalization is the normal design actuator stall force.

Figure 4:
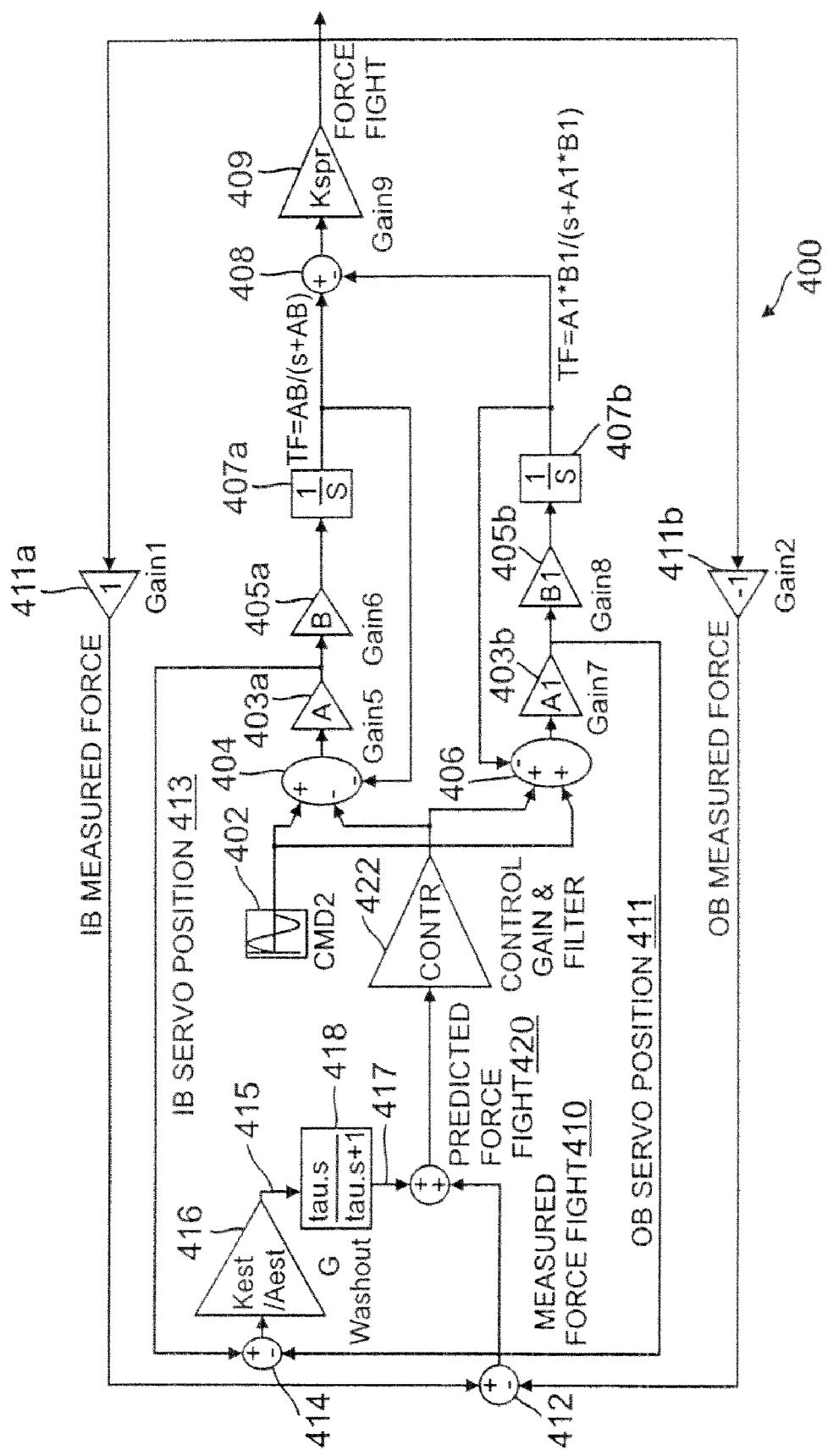
FIG. 4 illustrates an embodiment of the present invention by appropriate use of sensor feedback in combination with an actuation system to form a complementary filter (or lead-lag compensation)

To exemplify the operation of the present invention, FIG. 4 illustrates an example of a two actuator system 400, based upon first order lag actuator models, and introduces the notion of the force fight that occurs due to positioning errors of the two actuators and demonstrates how the actuator force fight is predicted. FIG. 4 also shows a complementary filter approach, such as a Quadrature Mirror Filter, hereinafter, "filter approach," introduced into the two actuator system 400.

As shown in FIG. 4, In one operational embodiment, CMD block 402 depicts a pilot or autopilot command signal applied to all the actuators that control a particular control surface. In this embodiment, the command signal CMD2 402 is applied to the upper and lower actuator control loop summing nodes 404 and 406. In one embodiment, the summing nodes 404 and 406 may each represent two summing nodes where the pilot command and the FEC command are summed in the PFC and the summed commands are then summed with the actuator position feedback in the ALCR (FIG. 1A).

The output of the portioned summing nodes, (functionally this output is actuator inches of error), is applied to the EHSV to open and position the EHSV to proportionally control the hydraulic fluid flow to the PCU. The transfer function relationship between the summing node 404 and 406 output and the EHSV position is represented by A (Gain5 403a) and A1 (Gain 403b). The relationship between EHSV position and the rate at which hydraulic fluid moves the PCU piston is represented by transfer functions B (Gain6 405a) and B1 (Gain8 405b).

The integrators, Int2 407a and Int3 407b, model how the positions of the PCU pistons (i.e. ram) change with respect to the rate at which the hydraulic fluid, flews into the PCU. The Laplacian transfer function, $$TF = \frac{A*B}{s + A*B}$$

shows how the PCU piston position changes with respect to pilot command for the model shown in FIG. 4. The transfer function is that of a low pass filter which implies that the position response is delayed relative to the command. Due to tolerance effects, the positions of the PCU pistons may be different. This positional difference acts upon the effective force fight loop stiffness and creates a force fight modeled by summing node 408, the integrators Int2, Int3 and the Kspr (Gain9 409).

With continued reference to FIG. 4, Gain1 411a and Gain2 411b represent the force sensors 202 (FIG. 2), which are ideally modeled as gains of +1 and −1 respectively. Because the system is measuring force fight, the force observed in actuator 2 reacts to the force created by actuator 1, thus, the signs of the sensed forces are opposite. The force signals flow into summing node 412, which is equivalent to the actual force block 206a of force sensing load loop 206 (FIG. 2), where the difference between the two force sensors, Gain1 411a and Gain2 411b, is computed to cancel out the effects of the airload. The output is the Measured Force Fight (MFF) signal 410, which may be equal to twice the average of the sensed force fight. The signal is passed to the CONTR block 422, which is the equivalent of the FEC block 200 (FIG. 2), where several functional operations are performed. In this embodiment, the value of the MFF signal 410 is used to reduce sensitivity to sensor failures and to provide a degree of freedom for stabilizing the system. The MFF signal 410 may be passed through a "deadzone" function to eliminate limit cycles that may occur due to actuator friction and the quantization effects of a digital controller. The MFF signal 410 may be scaled to convert from force units to position units. This scaling may also include a factor to increase the loop gain.

The MFF signal 410 may be passed through a dual purpose low pass filter to limit the bandwidth of the controller for stability purposes and to provide a mechanism to gradually disable the controller as the actuator position nears the actuator endstops. This avoids the occurrence of limit cycles, if the FEC were active and an actuator hit its endstop. The resulting control signal is then appropriately summed (nodes 404, 406), positive or negative, with the pilot; or autopilot commands 402 to provide a compensating correction to the position of the actuators.

As was noted above, the transfer function that describes the PCU piston response to a pilot command is a low pass filter that involves delay which reduces the performance of the FEC. In one embodiment, the transfer function for the EHSV position is:

$$TF1 = \frac{s*A}{s + A*B}$$

The delay may be controlled if the EHSV transfer function is multiplied by the appropriate scaling factors and summed with the transfer function of the actuator. Thus, $$\frac{s*\frac{A}{G}}{s + A*B} + \frac{A*B}{s + A*B} = \frac{A}{G} * \frac{s + G*B}{s + A*B} = 1,$$

if G=A and implies there is no delay in the signal path, which is the objective of a complementary filter. If the design value, G, which represents A or A1 (See FIG. 4) is chosen to be less than the actual value of A, then the net transfer function represents a "Lead-Lag" controller with gain which actually anticipates or predicts the force fight and provides force correction before it occurs.

In one example, since the derivative signal, EHSV position signals 411 and 413, cannot directly effect position changes of the actuator, the servo position signals are fed back to the EHSV servo position summing node 414, which is equivalent to derived force block 206b in FIG. 2. In this event, as shown with reference to FIG. 4, the EHSV servo position summing node 414, receives the servo position signals 411, 413 and passes them through a model of the derived force fight G, block 416, which multiplies the signals by the force fight loop stiffness Kest, and adjusts for the upstream gain, by dividing the signals by Aest ("G"), per the complementary filter approach.

It should be noted that Kest and Aest are estimated transfer functions that are typically simplified because the digital controller, RFC, may not be operated at a high enough rate to capture the dynamics of these signals. Additionally, Aest may be chosen to create a lead-lag compensation, as discussed above, so its value may not be the same as the A terms in the EHSV, shown in FIG. 4. The Kest term may also not be the same as the force fight loop stiffness because its value may be used to compensate for the gain that is created by choosing Aest to be different from the EHSV value, as also noted above. This signal provides additional stability to the force equalization controller and allows for larger gains.

The signal, on path 415, output from block 416 may also be stabilized using a washout or highpass filter 418 that provides the stabilization and prevents EHSV control loop saturation that may occur due to offset errors down stream of the feedback point. Referring again to FIG. 2, the offset errors are handled by the measured force feedback path to avoid offset errors in the servo valve (EHSV) position. Since the EHSV position difference is fed back through washout filter 41S, if the pilot command remains unchanged, the force equalization command transitions from the EHSV position path 205 through FEC 200 to the force sensor path 203 through FEC 200. That is, the force fight clue to changes in position command is largely compensated through the EHSV position path 205 to the FEC 200 while force fight due to static errors in the relative positioning of the PCUs 120a and 120b is corrected by the force sensor path 203 to the FEC 200.

In the event that one actuator powers up before the other actuator, the EHSV position of the first active actuator may be significantly washed out before the second actuator is activated. This may cause FEC 200 to create force fight until the system transient settles out. In this event, the washout filter 418 may be held in reset until all actuators are powered and engaged.

Referring again to FIG. 4, in one embodiment, the resulting washed out EHSV position (factored position force fight) signal on path 417 is summed with the MFF signal 410 to create a predicted force fight signal 420. The predicted force fight signal 420 is then inserted into CONTR 422 and the force equalization limiters, gains, friction compensators and low pass filter are applied.

Figure 5:
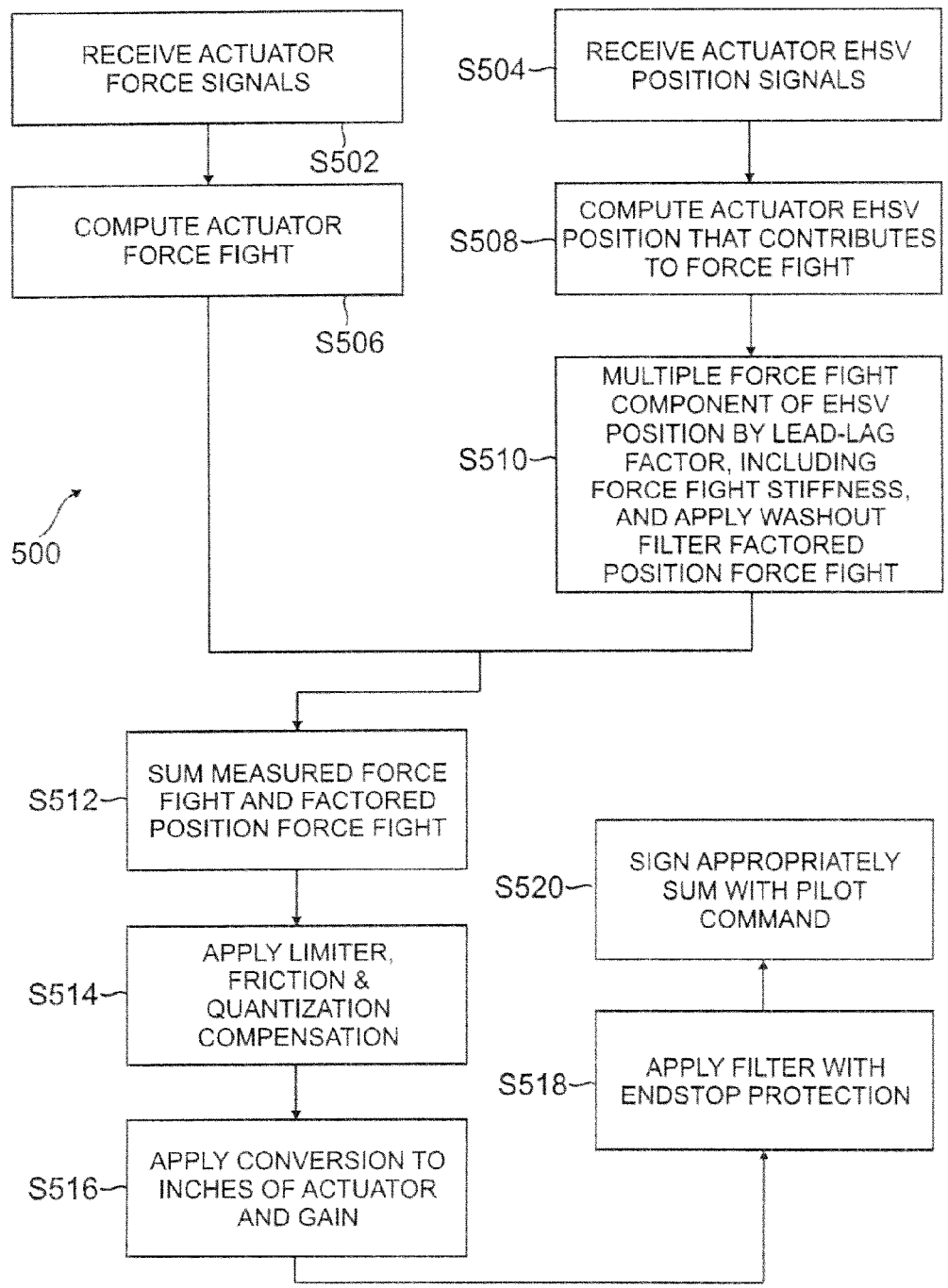
FIG. 5 is a flowchart illustrating a process in accordance with an embodiment of the present invention.

FIG. 5 is flowchart showing a process 500 for controlling the forces between actuators in a multi-actuator actuation system in accordance with an embodiment. In step s502, a controller receives a signal from a plurality of EHSV position sensors, which is proportional to an actuator rate. In step s504, the controller receives from a plurality of force sensors a signal proportional to an actuator ram force. In step s506 the controller computes the actuator force fight. In step s508, the controller computes the portion of the actuator EHSV position that leads to force fight.

In step s510, the controller multiplies the actuator EHSV position that leads to force fight by the lead-lag factor, $$\frac{Kest}{Aest},$$

where Kest accounts for the estimated force fight loop stiffness and any corrective gain factors. In step s510 the EHSV loop stabilizing washout filter is also applied; stabilizing the inner control loop (FIG. 4).

In step s512, the controller sums the force sensor measured force fight term and the EHSV predicted force fight term to create an overall predicted force fight (see FIG. 4).

In step s514, the controller applies a signal limiter and compensation for limit cycles that may result due to actuator friction and digital controller quantization. In step s516, the controller multiplies the signal by a conversion factor to relate force fight to relative PCU piston positions, $$\frac{1}{Kforcefight}.$$

The controller also multiplies by a gain factor that improves the performance of the equalization. In step s518, the controller low pass filters the signal and ensures the controller does not create limit cycles when a PCU piston hits its endstop.

In step s520, the controller appropriately sums the force equalization command with the pilot or autopilot command, to command each actuator to move in a way that reduces the force fight.

Although the foregoing disclosure has been described with reference to specific embodiments, these embodiments are illustrative only and not limiting. For example, there may be extensions of the disclosure into torque management; both for the case where there are multiple actuators on the same motion device and for the directional control case where wheels are individually powered and commanded and it is desired that the unit move straight ahead. Many other applications and embodiments will be apparent in light of this disclosure and the following claims.

What is claimed is:

1. A method for controlling the forces between actuators in a multi-actuator actuation system comprising:
   determining a first force fight component substantially equal to an amount of a position offset that contributes to a force fight on a control surface;
   determining a second force fight component substantially equal to an amount of a force that contributes to the force fight on the control surface;
   multiplying the first force fight component by a lead-lag factor to generate a factored first force fight component, the lead-lag factor being substantially equal to Kest/Aest and wherein the lead-lag factor accounts for an estimated force fight loop stiffness and for corrective gain factors;
   summing the factored first force fight component and the second force fight component to generate a predicted force fight; and
   generating a force equalization command as a function of the predicted force fight to cause a compensating change to the actuator position.

2. The method of claim 1, wherein determining the first force fight component comprises receiving a position signal from a plurality of position sensors.

3. The method of claim 2, wherein the position signal comprises an electro-hydraulic servo valve position signal.

4. The method of claim 2, wherein the position signal comprises a position signal proportional to an actuator rate.

5. The method of claim 1, wherein determining the second force fight component comprises receiving a force signal from a plurality of force sensors proportional to an actuator ram force.

6. The method of claim 1, further comprising applying to the predicted force fight a signal limiter and compensation for limit cycles that may result due to actuator friction and digital controller quantization.

7. The method of claim 1, further comprising multiplying the predicted force fight by a conversion factor to relate the predicted force fight to an actuator ram position.

8. The method of claim 1, further comprising multiplying the predicted force fight by a gain factor that improves the performance of the equalization.

9. The method of claim 1, further comprising filtering the predicted force fight through a low pass filter to limit the creation of limit cycles when an actuator ram hits its endstop.

10. The method of claim 1, wherein generating the force equalization command comprises summing the force equalization command with a pilot or autopilot command, to command the actuator to cause the compensating change to the actuator position.

11. The method of claim 1, wherein the control surfaces comprise ailerons, flaperons, rudders, elevators, elevons, canards and ruddervators.

12. The method of claim 1, further comprising applying a force equalization limiter to the predicted force fight signal.

13. The method of claim 1, further comprising applying a friction compensator signal to the predicted force fight signal.

14. The method of claim 1, further comprising applying a gain to the predicted force fight signal.

15. The method of claim 1, further comprising applying a low pass filter to the predicted force fight signal.

16. A method for controlling the forces between actuators in a multi-actuator actuation system comprising:
receiving from a plurality of position sensors a signal proportional to an actuator rate;
receiving from a plurality of force sensors a signal proportional to an actuator ram force;
determining a force fight component on the actuator system;
multiplying the force fight component by a lead-lag factor substantially equal to Kest/Aest and wherein the lead-lag factor accounts for an estimated force fight loop stiffness and for corrective gain factors; and
computing a difference in actual actuator rates and summing the difference with a computed difference in actuator forces to generate an actuator positioning command that equalizes the actuator forces on a control surface.

17. The method of claim 16, wherein said plurality of force sensors sense actuator ram forces.

18. The method of claim 16, wherein the control surface comprises ailerons, flaperons, rudders, elevators, elevons, canards and ruddervators.

19. The method of claim 16, further comprising summing the actuator positioning command with a pilot or autopilot command, to command an actuator to cause a compensating change to the actuator position.

* * * * *